(12) United States Patent
Lau et al.

(10) Patent No.: US 8,149,854 B2
(45) Date of Patent: Apr. 3, 2012

(54) MULTI-THREADED TRANSMIT TRANSPORT ENGINE FOR STORAGE DEVICES

(75) Inventors: Victor Lau, Marlboro, MA (US); Pak-lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 1412 days.

(21) Appl. No.: 11/174,197

(22) Filed: Jun. 30, 2005

(65) Prior Publication Data

US 2007/0019636 A1  Jan. 25, 2007

(51) Int. Cl.
*H04L 12/28* (2006.01)
*H04J 3/24* (2006.01)
*G06F 15/167* (2006.01)
*G06F 13/28* (2006.01)
*G06F 3/00* (2006.01)

(52) U.S. Cl. .......... 370/412; 370/474; 709/216; 710/22; 710/30

(58) Field of Classification Search .................. 370/389, 370/392, 401, 412, 471, 474; 709/212–219; 710/22, 29, 30, 52
See application file for complete search history.

(56) References Cited

U.S. PATENT DOCUMENTS

| | | | | |
|---|---|---|---|---|
| 5,864,712 | A * | 1/1999 | Carmichael et al. | 710/20 |
| 6,651,117 | B1 * | 11/2003 | Wilson et al. | 710/33 |
| 6,772,237 | B2 * | 8/2004 | Collier | 710/22 |
| 2002/0191599 | A1 * | 12/2002 | Parthasarathy et al. | 370/389 |
| 2003/0004683 | A1 * | 1/2003 | Nemawarkar | 702/186 |
| 2004/0111540 | A1 * | 6/2004 | Narad | 710/52 |
| 2005/0138258 | A1 | 6/2005 | Seto | |

FOREIGN PATENT DOCUMENTS

WO    WO 99/16195    4/1999

OTHER PUBLICATIONS

ITECH, "Meeting Your Fibre Channel Analysis Needs", http://www.i-tech.com/News%20&%20Events/E-NewsArchive0604.php.
HP, "SAS phy layer", http://www.scsita.org, 2003, Hewlett-Packard Corporation.
Intel, "Case Study: LSI Logic Corp.", Intel Literature CEnter: developer.intel.com/design/litcenter.
LSI Logic, "Serial Attached SCSI: SAS Compared to Fibre Channel", http://www.lsilogic.com/technologies/industry_standards/sas_pages/sas_vs_fibre.html.
LSI Logic, "LSISAS1064 4-Port 3 Gbit/s Serial Attached SCSI Controller", Datasheet Version 2.0, Jan. 2005.
M. Evans, "Introduction to Serial Attached SCSI", Maxtor, May 23, 2003.

(Continued)

*Primary Examiner* — Aung S Moe
*Assistant Examiner* — Redentor Pasia
(74) *Attorney, Agent, or Firm* — Blakely, Sokoloff, Taylor & Zafman LLP

(57) ABSTRACT

An embodiment of the present invention is a technique to process a plurality of I/O sequences associated with a storage device. A task context pre-fetch engine pre-fetches a task context from a task context memory based on a pre-fetch request. At least a multi-threaded transmit transport layer (TxTL) processes the plurality of I/O sequences from an I/O pool simultaneously. The multi-threaded TxTL generates the pre-fetch request and one or more frames from the plurality of I/O sequences. A switch fabric and controller routes the frame to a link layer associated with the storage device.

20 Claims, 10 Drawing Sheets

OTHER PUBLICATIONS

LSI Logic and Seagate Technology, "SAS: The Path to Maximum SATA Scalability", joint whitepaper, Oct. 2004.
Seagate, "Technology Paper: Serial Interfaces in the Enterprise Environment", No. TP-306, Dec. 2002.
Seagate, "Technology Paper: Bridging the Enterprise Storage Continuum with Serial Attached SCSI", No. TP-519, Jan. 2004.
Serial ATA, "Serial ATA in Servers and Networked Storage", www.serialata.org.
PCT/US2006/025756, PCT International Search Report and Written Opinion of the International Searching Authority, mailed Dec. 11, 2006, 7 pages.
PCT/US2006/025756, PCT International Preliminary Report on Patentability and Written Opinion of the International Searching Authority, issued Jan. 9, 2008, 6 pages.
Schimdt, Douglas C. et al., "Leader/Followers", In: Proceeding of the 7th Pattern Languages of Programs Conference, 2000, pp. 1-40.
Wang, Shuo et al., "Multi-thread IO in High Quality Digital Broadcasting System", Proceedings of the 2003 International Conference on Computer Networks and Mobile Computing, Oct. 20-23, 2003, pp. 442-445.
Varada, S. et al., "Data flow and Buffer management in multi-channel data link controller", Proceedings of the 24th Annual IEEE Conference on Local Computer Networks, 1999, pp. 132-141.

* cited by examiner

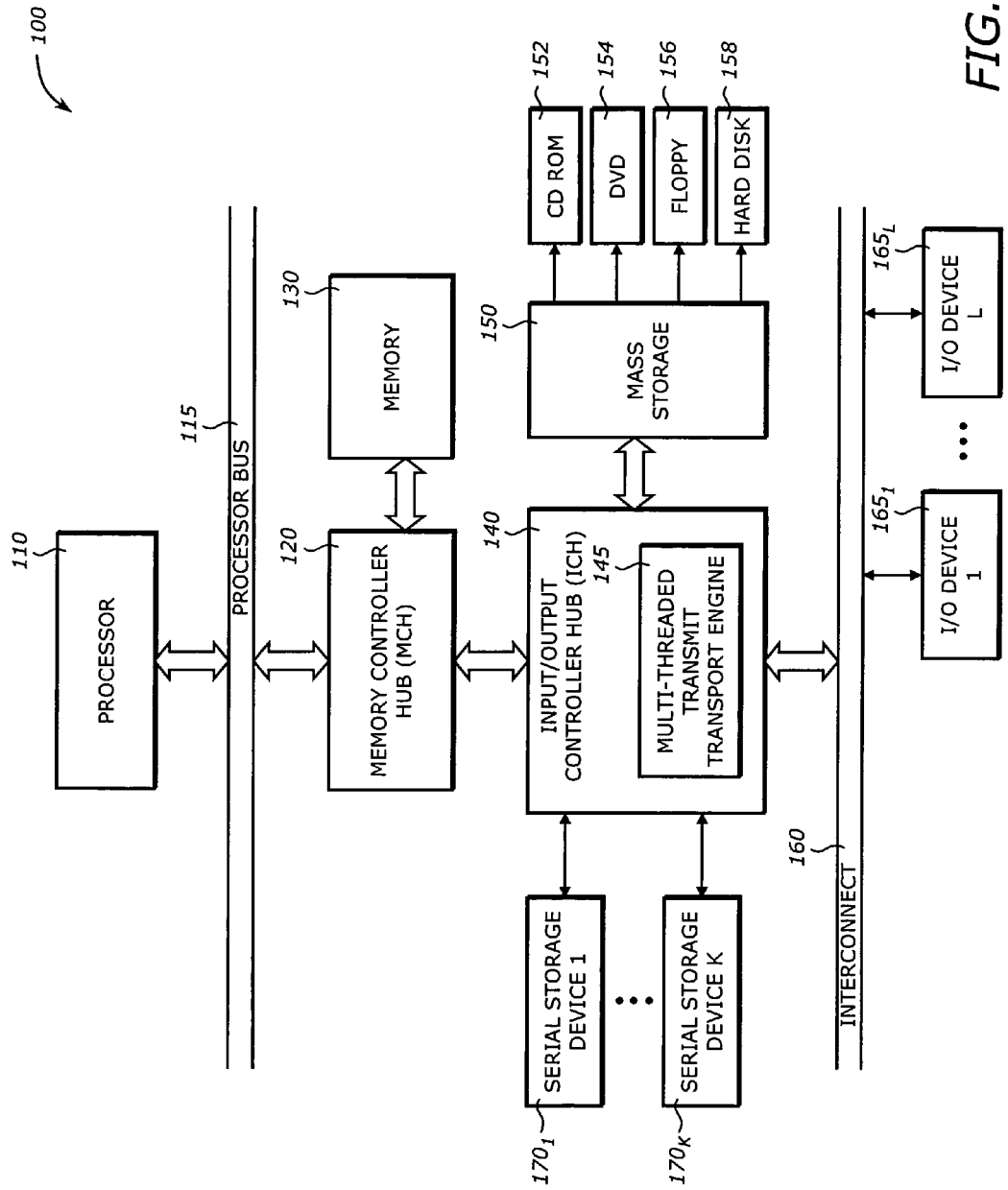

MULTI-THREADED TRANSMIT TRANSPORT ENGINE FOR STORAGE DEVICES

BACKGROUND

1. Field of the Invention

Embodiments of the invention relate to the field of microprocessor systems, and more specifically, to storage systems.

2. Description of Related Art

Recent advances in storage technology have provided a variety of storage devices and interface protocols. Examples of these devices and protocols include Serial Attached Small Computer System Interface (SAS), Fiber Channel (FC), Serial Advanced Technology Attachment (SATA), Internet Small Computer System Interface (ISCSI), Host Bus Adapter (HBA), etc.

Currently, storage devices handle input/output (I/O) sequences in a serial fashion as single threads. For small or medium storage systems, single-threaded I/O processing may be adequate to satisfy I/O demands. However, large storage systems using high performance processors such as multi-core, multi-processor systems with virtual I/O and hyper-threading technology typically require an increasing number of I/O sequences. For these systems, it is difficult for single-threaded storage devices to keep up with the required number of I/O sequences.

BRIEF DESCRIPTION OF THE DRAWINGS

Embodiments of invention may best be understood by referring to the following description and accompanying drawings that are used to illustrate embodiments of the invention. In the drawings:

FIG. 1B is a diagram illustrating a computer system in which one embodiment of the invention can be practiced.

DESCRIPTION

An embodiment of the present invention is a technique to process multiple I/O sequences in parallel associated with one or more storage devices. A task context pre-fetch engine pre-fetches a task context from a task context memory based on a pre-fetch request. At least a multi-threaded transmit transport layer (TxTL) processes the multiple I/O sequences from an I/O pool simultaneously. The multi-threaded TxTL generates the pre-fetch request and one or more frames from the multiple I/O sequences. A switch fabric and controller routes the frame to a link layer associated with the storage device.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

One embodiment of the invention is a technique to provide multiple threads for I/O sequences associated with storage devices or remote nodes. The technique includes a number of protocol engines (PEs) that are committed to processing the I/O sequences simultaneously. While one PE is busy handling an I/O sequence or waiting for data payload from the memory, another PE is ready to transmit frames for another I/O sequence. Therefore, there are no wasteful idle periods. The technique is efficient and provides very high I/O throughput.

Figure 1A:
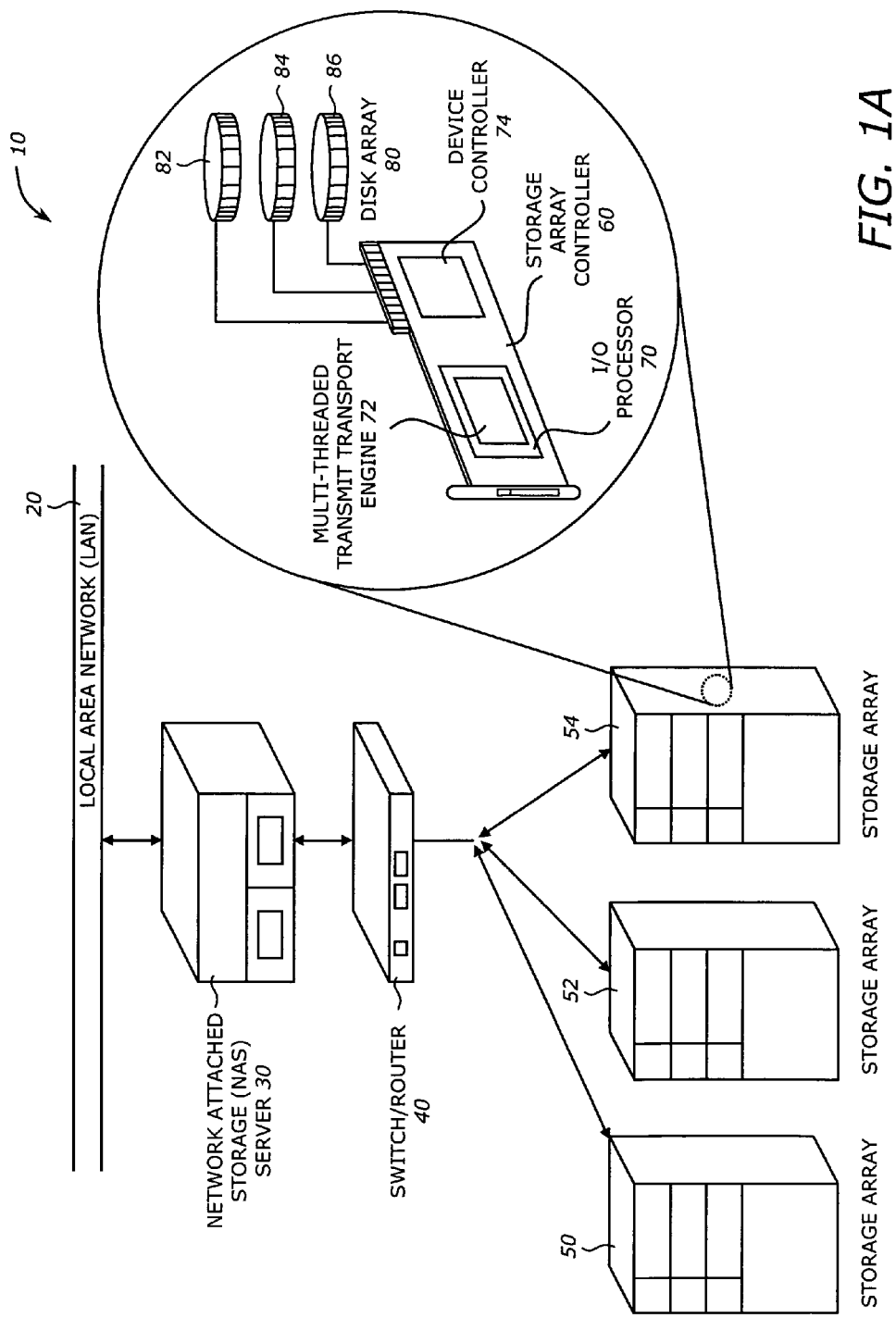
FIG. 1A is a diagram illustrating a server system in which one embodiment of the invention can be practiced.

FIG. 1A is a diagram illustrating a server system 10 in which one embodiment of the invention can be practiced. The server system 10 includes a local area network (LAN) 20, a network attached storage (NAS) server 30, a switch/ router 40, and storage arrays 50, 52, and 54. Note that the server system 10 may include more or less than the above elements.

The LAN 20 is any local area network within an organization. Typically the LAN 20 is an Ethernet. The NAS server 30 is a server that provides hard disk storage to a main server. It is assigned an Internet Protocol (IP) address and provides fast access to applications programs and files. The switch/router 40 provides connectivity and routing to the storage arrays 50, 52, and 54.

The storage arrays 50, 52, and 54 include multiple redundant arrays of inexpensive disks (RAID) systems, and software for configuring and mapping file location to the network-attached device. The storage array 54 includes a storage array controller 60 and a disk array 80.

The storage array controller 60 controls the disk array 80. It includes an I/O processor 70 and a device controller 74. The I/O processor 70 performs I/O operations including read and write accesses to the disk array 80. It includes a multi-threaded transmit transport engine 72. The multi-threaded transmit transport engine 72 provides multiple threads to process multiple I/O sequences simultaneously. The disk array 80 includes a number of disks 82, 84, and 86.

FIG. 1B is a diagram illustrating a computer system 100 in which one embodiment of the invention can be practiced. The system 100 includes a processor unit 110, a processor bus 115, a memory controller hub (MCH) 120, a main memory 130, an input/output controller hub (IOH) 140,, a mass storage device 150, an interconnect 160, input/output (I/O) devices 165$_1$ to 165$_L$, and serial storage devices 170$_1$ to 170$_K$.

The processor unit 110 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. The processor bus 115 provides interface to the MCH 120 or other processors. The processor bus 115 may support single processor or multi-processor configurations.

The MCH 120 provides control and configuration of memory and input/output devices such as the main memory 130 and the ICH 140. The MCH 120 may be integrated into a chipset that integrates multiple functionalities such as graphics, media, isolated execution mode, host-to-peripheral bus interface, memory control, power management, etc. The MCH 120 or the memory controller functionality in the MCH 120 may be integrated in the processor unit 110. In some embodiments, the memory controller, either internal or external to the processor unit 110, may work for all cores or processors in the processor unit 110. In other embodiments, it may include different portions that may work separately for different cores or processors in the processor unit 110.

The main memory 130 stores system code and data. The main memory 130 is typically implemented with dynamic random access memory (DRAM), static random access memory (SRAM), flash memory, or any other types of memories including those that do not need to be refreshed.

The ICH 140 has a number of functionalities that are designed to support I/O functions. The ICH 140 may also be integrated into a chipset together or separate from the MCH 120 to perform I/O functions. The ICH 140 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, etc. In particular, the ICH 140 includes a multi-threaded transmit transport engine 145. The multi-threaded transmit transport engine 145 provides multiple threads to process multiple I/O sequences simultaneously. It is similar to the multi-threaded transmit transport engine 72 shown in FIG. 1A.

The mass storage device 150 stores archive information such as code, programs, files, data, and applications. The mass storage device 150 may include compact disk (CD) read-only memory (ROM) 152, digital video/versatile disc (DVD) 154, floppy drive 156, and hard drive 158, and any other magnetic or optic storage devices. The mass storage device 150 provides a mechanism to read machine-accessible media.

The interconnect 160 provides interface to peripheral devices. The interconnect 160 may be point-to-point or connected to multiple devices. For clarity, not all the interconnects are shown. It is contemplated that the interconnect 160 may include any interconnect or bus such as Peripheral Component Interconnect (PCI), PCI Express, Universal Serial Bus (USB), and Direct Media Interface (DMI), etc. The I/O devices $165_1$ to $165_L$ may include any I/O devices to perform I/O functions. Examples of I/O devices $165_1$ to $165_L$ include controller for input devices (e.g., keyboard, mouse, trackball, pointing device), media card (e.g., audio, video, graphics), network card, and any other peripheral controllers.

The serial storage devices $170_1$ to $170_K$ are any serial storage devices such as SAS, SATA, FC, ISCSI, and HBA. They are interfaced to the multi-threaded transmit transport engine 145. They may have throughputs ranging from several hundred megabits per second (Mbits/sec) to several Gigabits per second (Gbits/sec). They may have several protocols to transport data over the serial interfaces. Examples of these protocols include Serial Small Computer System Interface (SCSI) Protocol (SSP), SCSI Management Protocol (SMP), and Serial ATA Tunneling Protocol (STP). There may be several layers within the protocols such as physical layer, link layer, port layer, transport layer, and application layer.

Figure 2:
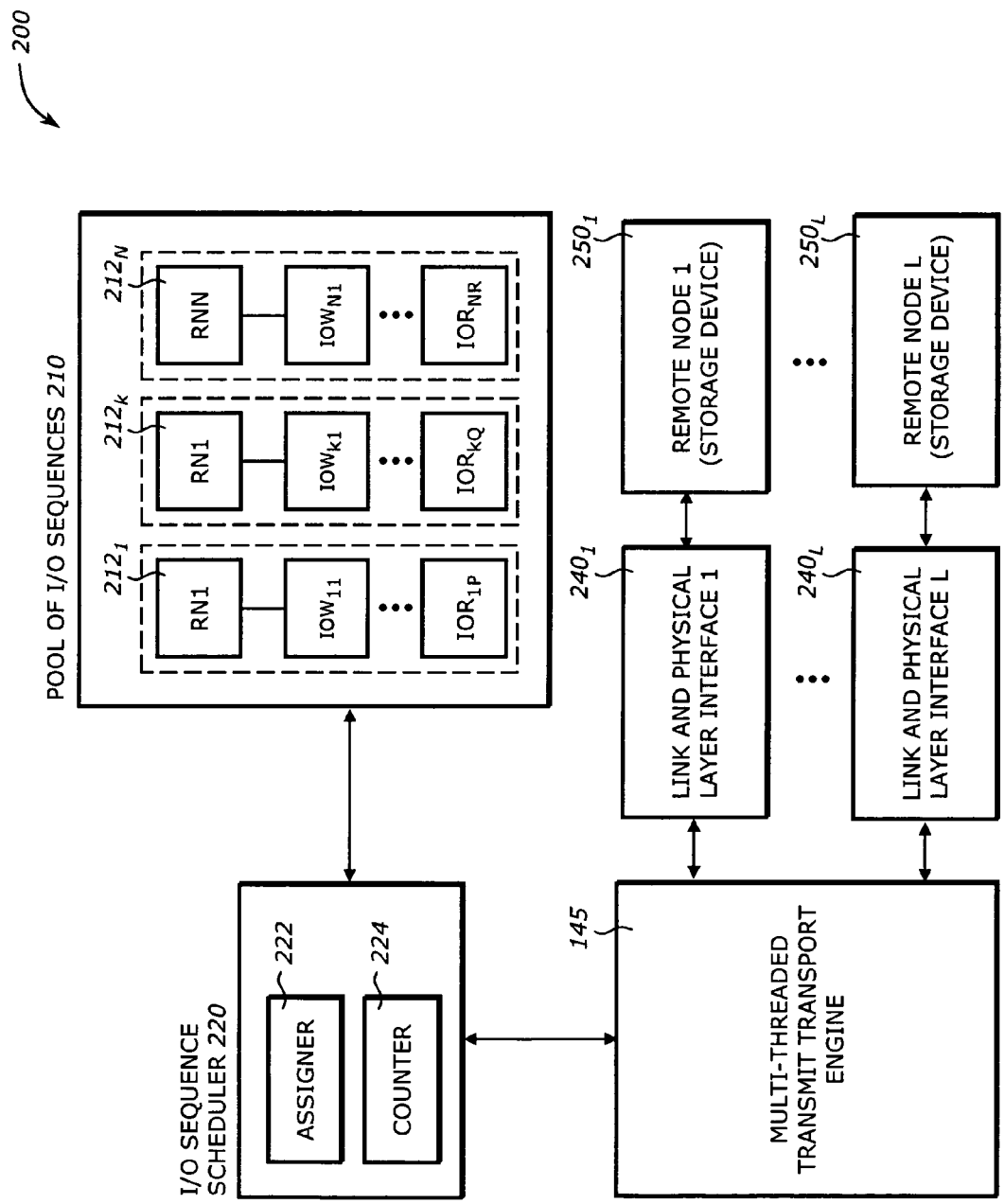
FIG. 2 is a diagram illustrating a multi-threaded I/O processing environment according to one embodiment of the invention.

FIG. 2 is a diagram illustrating a multi-threaded I/O processing environment 200 according to one embodiment of the invention. The environment 200 includes a pool 210 of I/O sequences, an I/O sequence scheduler 220, a multi-threaded transmit transport engine 145, one or more link and physical layer interfaces $240_1$ to $240_L$, and one or more remote nodes $250_1$ to $250_L$.

The pool 210 includes a number of I/O sequences $212_1$ to $212_N$ from N remote nodes. They typically include I/O operations such as data transfers, message transmissions, etc. Each of the I/O sequences may include I/O reads and/or I/O writes. For example the I/O sequence $212_1$ includes the identifier RN 1 for the remote node 1, I/O write $IOW_{11}$ to I/O read $IOR_{1P}$. Similarly, the I/O sequence $212_k$ includes the identifier RN k for the remote node k, I/O write $IOW_{k1}$ to I/O read $IOR_{kQ}$; and the I/O sequence $212_N$ includes the identifier RN N for the remote node N, I/O write $IOW_{N1}$ to I/O read $IOR_{NR}$.

The I/O sequence scheduler 220 may be implemented by hardware, software, firmware, or any combination thereof. It schedules servicing the I/O sequences in the pool 210. It includes an assigner 222 and a counter 224. The assigner 222 assigns an I/O sequence to an appropriate thread in the multi-threaded transmit transport engine 145 when one is available. The counter 224 keeps track of number of threads executing for a remote node. This is done to distribute the workload and to balance the threads.

The multi-threaded transmit transport engine 145 includes multiple threads to process a number of I/O sequences at the same time. By processing multiple I/O sequences, wasteful idle periods may be avoided, resulting in high I/O throughput.

The link and physical layer interface $240_i$ (i=1, . . . ,L) provides interface to the storage devices or remote nodes at the appropriate layers according to the underlying protocol. The remote node $250_i$ (i=1, . . . ,L) represents a storage device such as a hard disk. The remote node 250 has a remote address so that it can be identified in data transmission.

Figure 3:
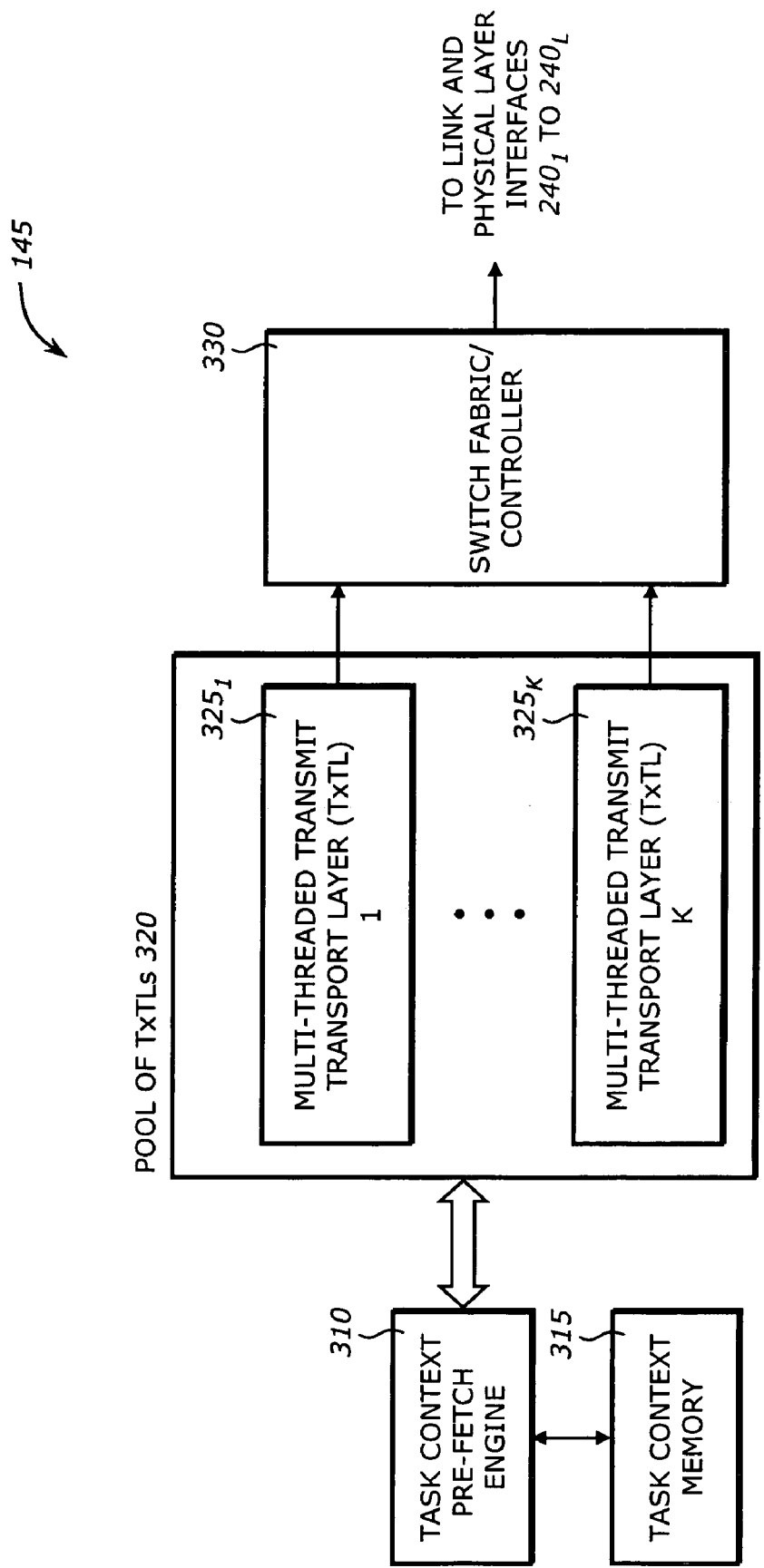
FIG. 3 is a diagram illustrating a multi-threaded transmit transport engine according to one embodiment of the invention.

FIG. 3 is a diagram illustrating a multi-threaded transmit transport engine 145 according to one embodiment of the invention. The multi-threaded transmit transport engine 145 includes a task context pre-fetch engine 310, a task context memory 315, a pool 320 of multi-threaded transmit transport layers (TxTLs), and a switch fabric/controller 330.

The task context pre-fetch engine 310 pre-fetches a task context from the task context memory 315 based on a pre-fetch request. The pre-fetch request is provided by one of the multi-threaded TxTLs in the pool 320. The task context provides the context or the information regarding the task associated with servicing an 110 sequence. Examples of the context or information are to transmit a command frame, to transmit a data frame, etc. The task context memory 315 contains the contexts associated with the I/O sequences. It is typically implemented using fast SRAM.

The pool 320 includes multi-threaded TxTLs $325_1$ to $325_K$. Depending on a specific implementation, there may be a single multi-threaded TxTL or multiple multi-threaded TxTLs in the pool. In addition, a single TxTL may be configured to support a single thread or multiple threads of I/O sequences depending on the buffer size and the ability to keep track of states of the I/O sequences being serviced or processed. When it is configured to support a single thread, the number of T×TLs in the pool 320 represents the number of threads supported by the multi-threaded transmit transport engine 145. The multi-threaded T×TL in the pool 320 generates one or more frames to the switch fabric and controller 330 from the I/O sequence being processed. These frames are to be transmitted to a corresponding remote node.

The switch fabric/controller 330 routes the frame to the link and physical layer interface 240 associated with a storage device. When there are multiple multi-threaded T×TLs, the switch fabric and controller 330 connects the appropriate multi-threaded T×TL to the link and physical layer interface 240.

The number of threads needed to support a given link is implementation specific. It may depend on the buffer size, the protocol parameters, etc. In one embodiment, the number of threads may be determined from the link idle time when the T×TL switches the I/O sequence, i.e., the time need to process the I/O sequence, and the time to transmit the maximum allowable frames. For example, in the SAS Serial SCSI Protocol (SSP), the maximum burst size may be set to 16K in a mode page. Therefore, the number of threads NT needed to sustain this rate is:

$$N_t = \text{Round\_Down}(t_{link\_idle} + t_{burst}) / t_{burst} \quad (1)$$

where $t_{link\_idle}$ is the link idle time caused by processing the I/O sequence and tburst is the time to transfer the maximum burst size and Round_Down in the rounding down operation for a non-integer number (e.g., a value of 2.9 is rounded down to 2).

Figure 4:
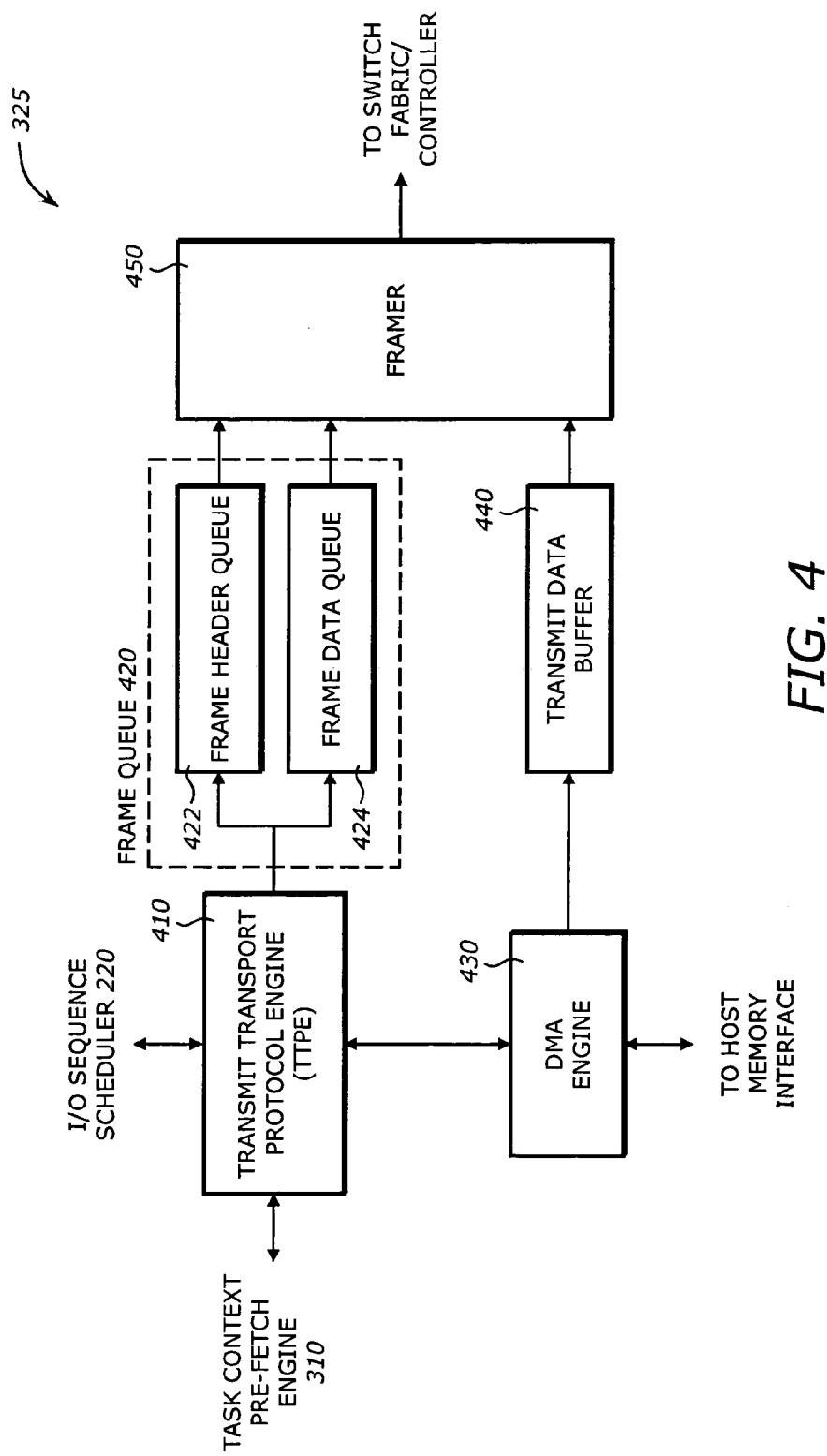
FIG. 4 is a diagram illustrating a multi-threaded transmit transport layer according to one embodiment of the invention.

FIG. 4 is a diagram illustrating a multi-threaded transmit transport layer 325 according to one embodiment of the invention. The multi-threaded transmit transport layer 325 includes a transmit transport protocol engine (PE) 410, a frame queue 420, a direct memory access (DMA) engine 430, a transmit data buffer 440, and a framer 450.

The transmit transport PE 410 performs operations on I/O sequences assigned by the I/O sequence scheduler. The operations include generation of transmit data from the I/O sequences, extraction of header information, creation of DMA descriptor, etc.

The frame queue 420 stores the frame information from the transmit transport protocol engine (PE) 410. The frame queue 420 may include a frame header queue 422 and a frame data queue 424. The frame header queue 422 stores a frame header for the transmit data. The frame data queue 424 stores the transmit data, which is created by the transmit transport protocol engine (PE) 410.

The direct memory access (DMA) engine 430 transfers data from a memory (e.g., memory 130 in FIG. 1) to the transmit data buffer 440 based on the DMA descriptor provided by the transmit transport PE 410. When there are multiple DMA transfers taking place at the same time, some arbitration logic may be used to resolve access conflicts.

The transmit data buffer 440 store the data transferred by the DMA engine 430. Typically it is organized as a queue that contains data waiting to be processed by the framer 450. It may be implemented by fast SRAM or first-in-first-out (FIFO) memory. The size of the transmit data buffer 440 may be used to determine the number of threads that can be supported by the multi-threaded transmit transport layer.

The framer 450 creates the frame based on the frame information, including the frame header and the frame data. The frame may follow some standard format compatible with the format of the remote node or storage device. When a frame is ready to sent, the framer 450 generates a frame transmit request to the switch fabric and controller.

Figure 5:
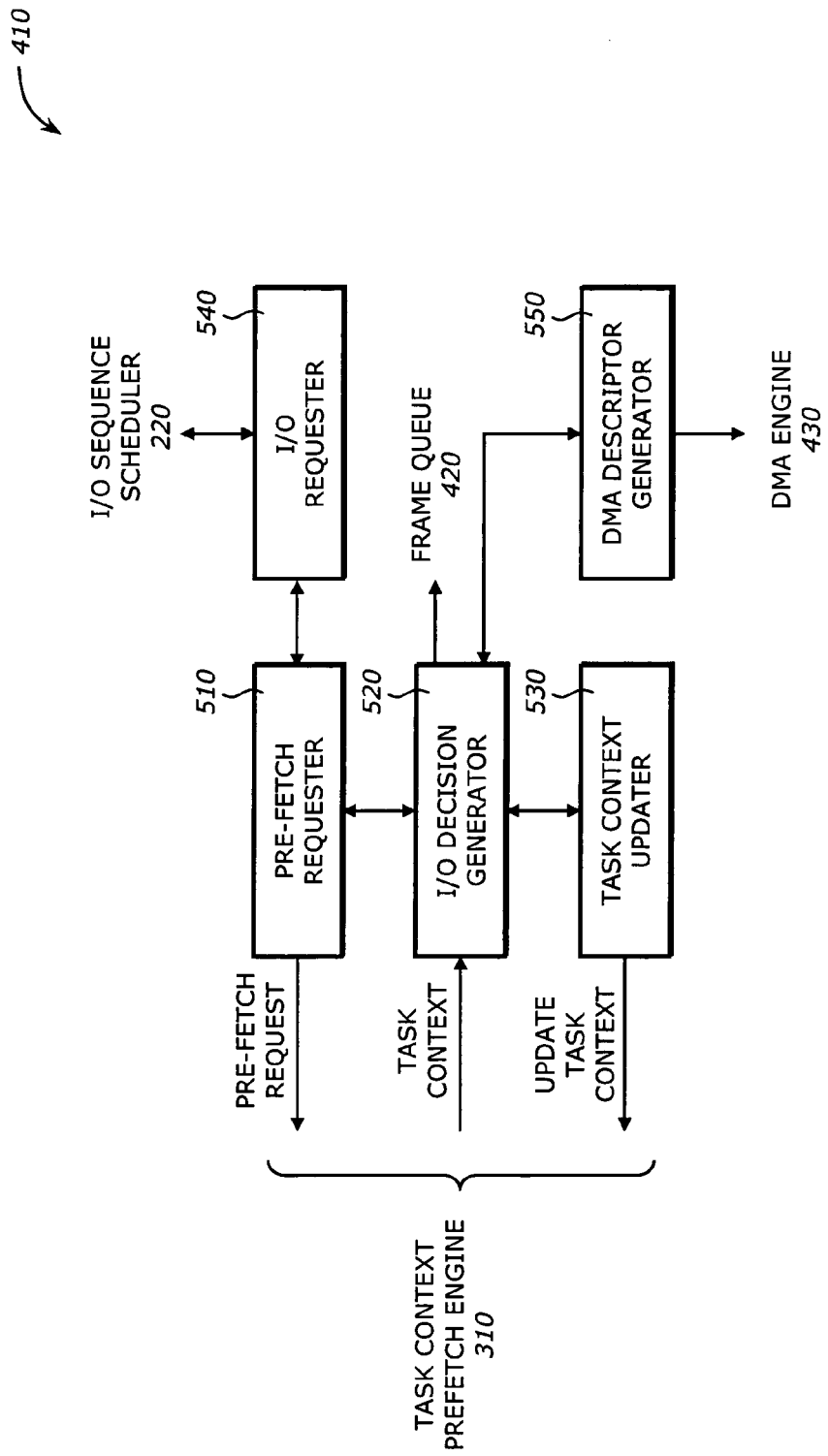
FIG. 5 is a diagram illustrating a transmit transport protocol engine according to one embodiment of the invention.

FIG. 5 is a diagram illustrating a transmit transport PE 410 according to one embodiment of the invention. The transmit transport PE 410 includes a pre-fetch requester 510, an I/O decision generator 520, a task context updater 530, an I/O requester 540, and a DMA descriptor generator 550.

The pre-fetch requester 510 generates the pre-fetch request to the task context pre-fetch engine 310 to obtain the task context. The pre-fetch request is generated whenever it is deemed that an I/O sequence is about to be fetched.

The I/O decision generator 520 generates an I/O handling decision based on the task context. When the task context pre-fetch engine receives the pre-fetch request, it returns the task context associated with the I/O sequence to be assigned to the underlying multi-threaded T×TL. The task context contains information regarding how the I/O sequence processed. The handling decision may include a decision to transmit a command frame or a data frame.

The task context updater 530 updates the task context associated with the I/O sequence being processed. The update is typically done immediately after the I/O sequence has been processed and sent to the destination node, or after a positive acknowledgement is received, or any other condition required by the underlying protocol. The update includes updates of the status of the I/O sequence, the address of the remote node, etc.

The I/O requester 540 requests for an I/O sequence from the I/O sequence scheduler 220. The I/O requester 540 generates the request whenever the underlying transmit transport PE 410 is available to accept a new I/O sequence. The I/O requester 540 may receive the I/O sequence from the pool and forward the I/O sequence to the pre-fetch requester 510.

The DMA descriptor generator 550 creates the DMA descriptor when the corresponding task context indicates that the I/O sequence involves a DMA transfer. The DMA descriptor may include information that is needed by the DMA engine 430 to perform a DMA transfer. This information may include the starting and/or ending addresses of the data block to be transferred, the count or number of bytes of data to be transferred, and any other information pertinent to the DMA.

Figure 6:
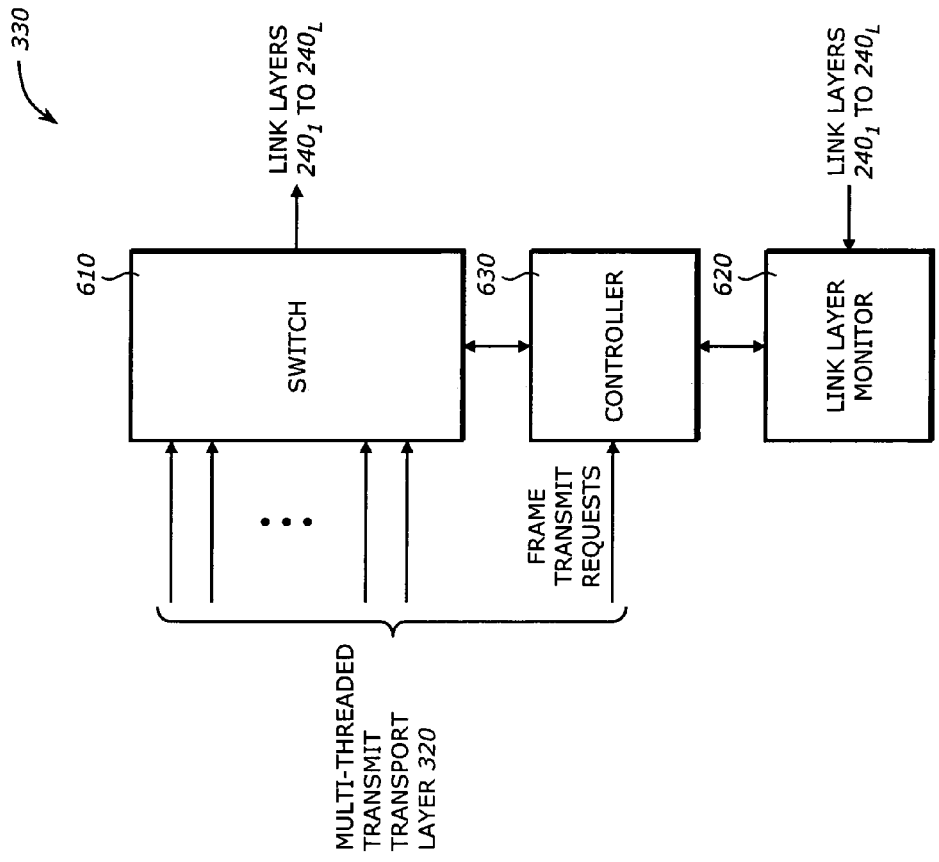
FIG. 6 is a diagram illustrating a switch fabric and controller according to one embodiment of the invention.

FIG. 6 is a diagram illustrating a switch fabric and controller 330 according to one embodiment of the invention. The switch fabric and controller 330 includes a switch 610, a link layer monitor 620, and a controller 630.

The switch 610 connects the link layer and the multi-threaded T×TL that is ready to forward a frame. The switch 610 may be implemented by any suitable switch structure such as a cross-bar switch. The link layer monitor 620 checks the link layer connection status to a remote node having a remote node address. It is noted that the connection status only applies to connection oriented protocol. For other protocols, appropriate status information is used. The connection status may be "no connection" or "connected to".The controller 630 controls the switch using the frame transmit request and to transmit the frame provided by the connected T×TL to the remote node via the switch 610 according to the connection status and the remote node address.

Figure 7:
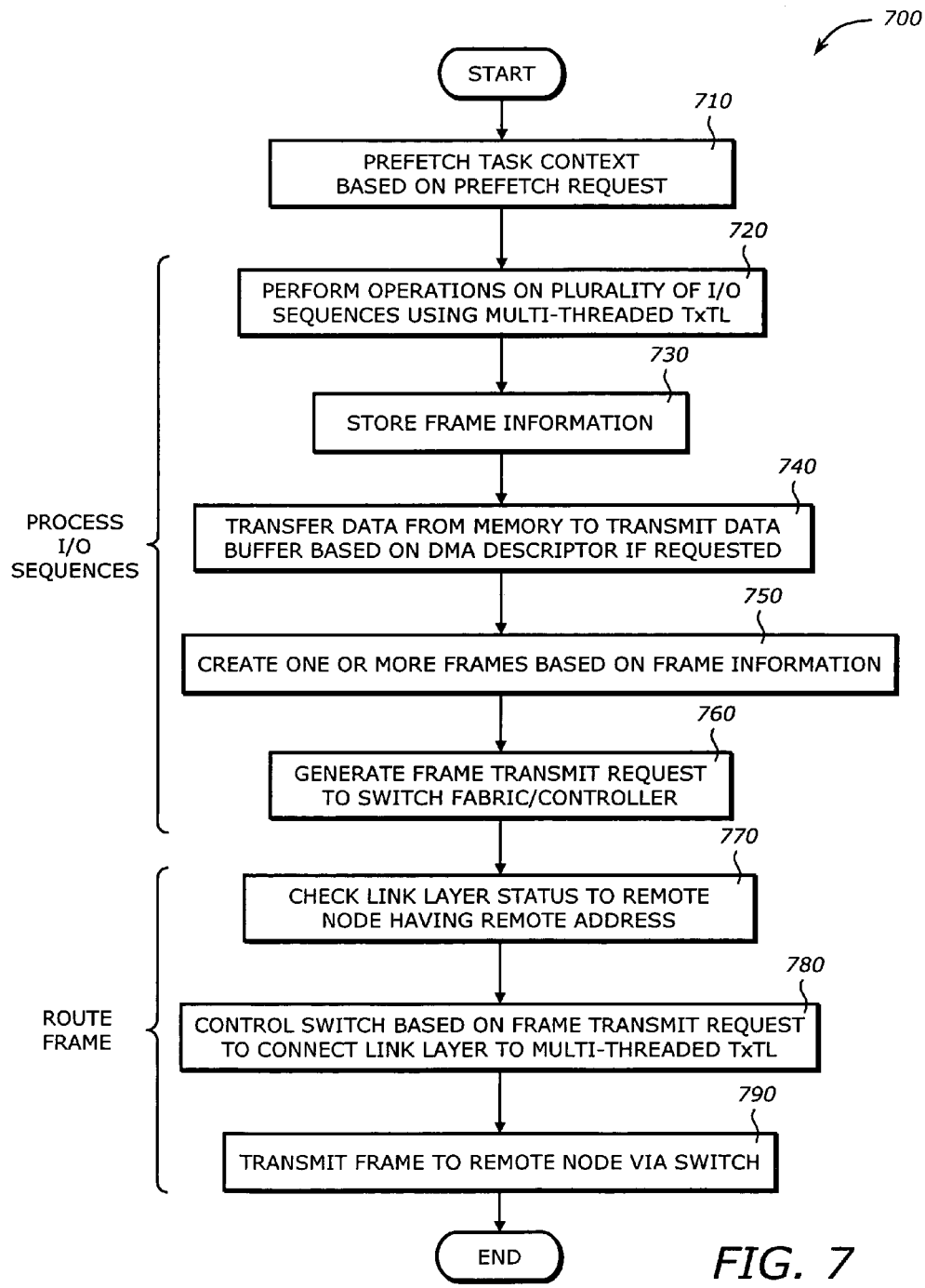
FIG. 7 is a diagram illustrating a process to process multiple I/O sequences according to one embodiment of the invention.

FIG. 7 is a diagram illustrating a process 700 to process multiple I/O sequences according to one embodiment of the invention. Upon START, the process 700 pre-fetches the task context based on a pre-fetch request (Block 710). The pre-fetch request is provided by a multi-threaded transmit transport layer. Next, the process 700 processes multiple I/O sequences simultaneously. The process 700 performs operations on the plurality of I/O sequences using a multi-threaded transmit transport layer (Block 720). Then, the process 700 stores the frame information (Block 730). The frame information may include a frame header and frame data. Next, the process 700 transfers data from a memory to the transmit data buffer based on a DMA descriptor (Block 740). Then, the process 700 creates one or more frames based on the frame information (Block 750). Next, the process 700 generates a frame transmit request to the switch fabric and controller (Block 760).

Then, the process 700 routes the frame to a link layer associated with a storage device. This may be performed by checking the link layer connection status to a remote node having a remote address (Block 770). It is noted that the connection status only applies to connection oriented protocol. For other protocols, appropriate status information is used. Then, the process 700 controls a switch based on the frame transmit request to connect the link layer to the requesting multi-threaded T×TL (Block 780). Next, the process 700 transmits the frame to the remote node via the switch using the remote name (Block 790). The process 700 is then terminated.

Figure 8:
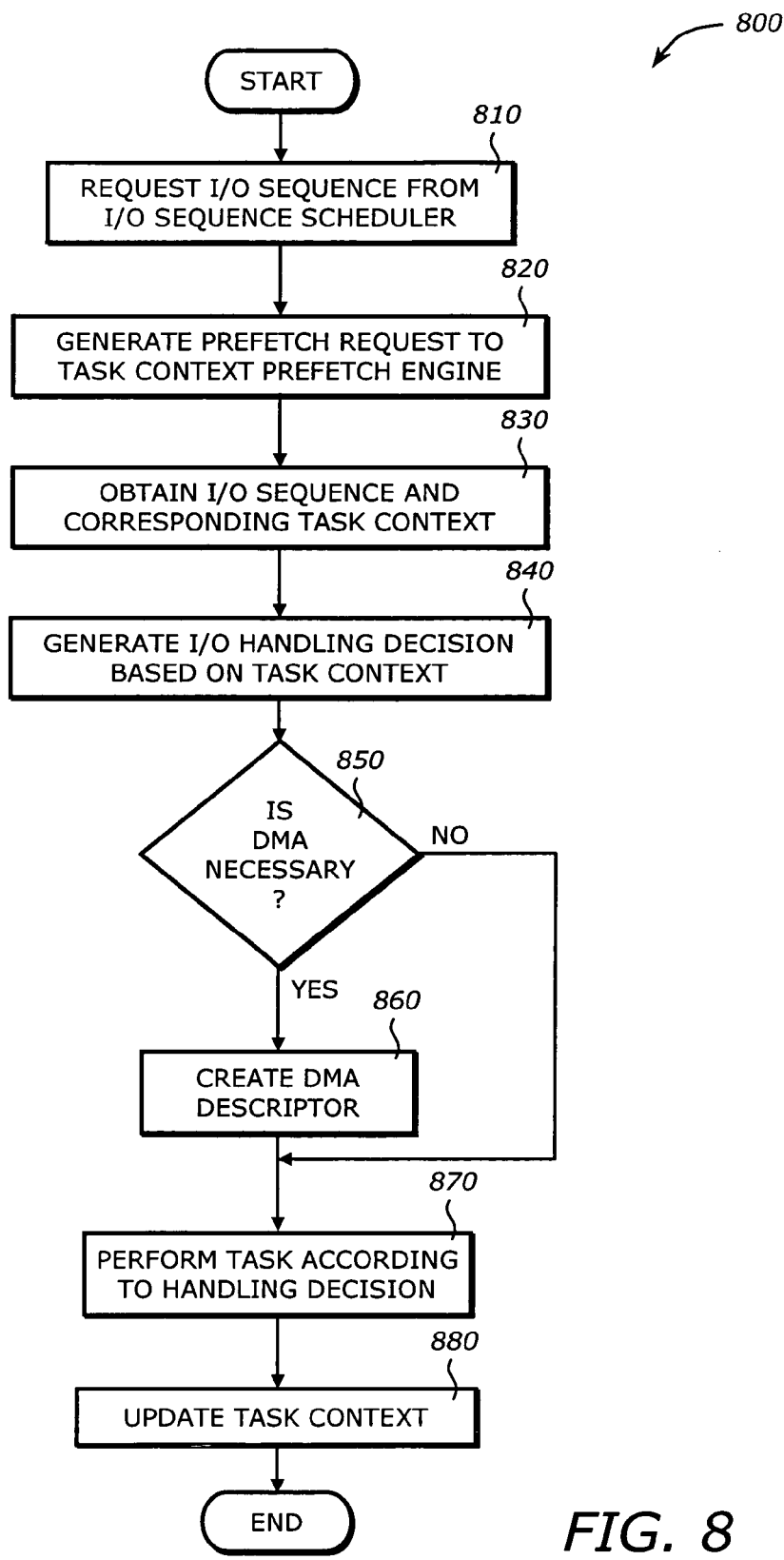
FIG. 8 is a diagram illustrating a process to perform operations on the I/O sequence according to one embodiment of the invention.

FIG. 8 is a diagram illustrating a process 720 to perform operations on the I/O sequence according to one embodiment of the invention.

Upon START, the process 720 requests an I/O sequence from the I/O sequence scheduler (Block 810). This is typically performed when the multi-threaded transport PE is ready. Next, the process 720 generates a pre-fetch request to the task context pre-fetch engine (Block 820). Then, the process 720 obtains the I/O sequence and the corresponding task context from the task context memory (Block 830). Next, the process 720 generates the I/O handling decision based on the task context (Block 840).

Then, the process 720 determines if DMA is necessary from the I/O sequence and the task context (Block 850). If so, the process 720 creates a DMA descriptor to be used for the DMA (Block 860) and proceeds to Block 870. Otherwise, the process 720 performs the task according to the handling decision (Block 870). Then, the process 720 updates the task context (Block 880) and is then terminated.

Figure 9:
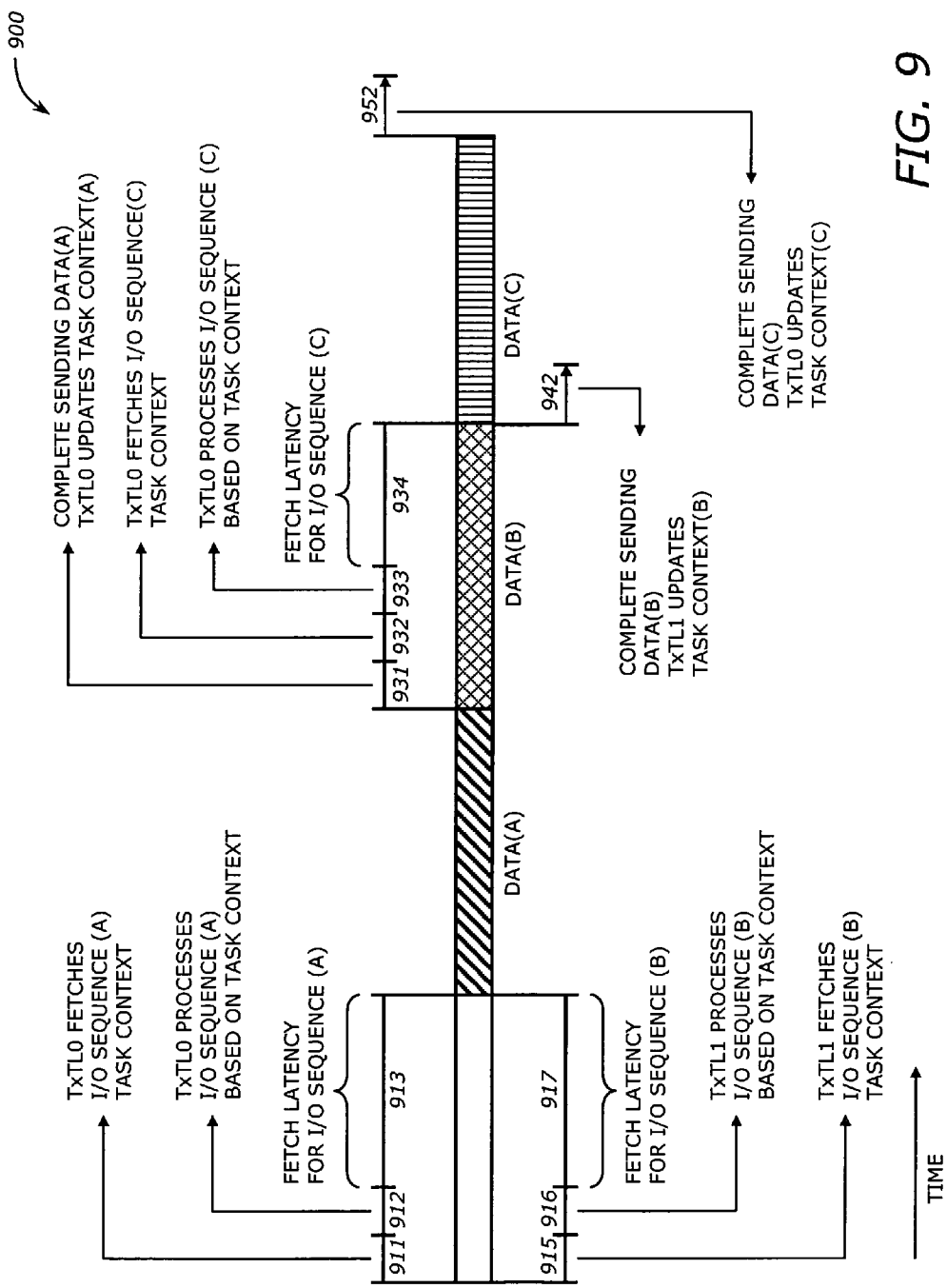
FIG. 9 is a timing diagram illustrating a multi-threaded processing of I/O sequences according to one embodiment of the invention.

FIG. 9 is a timing diagram illustrating a multi-threaded processing 900 of I/O sequences according to one embodiment of the invention. The processing 900 includes time periods 910, 920, 930, and 940.

The time period 910 is the start of processing of the I/O sequences. Suppose that during this period, two multi-threaded T×TLs are available: T×TL0 and T×TL1. Each of the T×TLs has its own timing. Within the time period 910, the T×TL0 has time periods 911, 912, and 913, and the T×TL1 has time periods 915, 916, and 917.

During the time period 911, the T×TL0 generates an I/O request to the I/O sequence scheduler. The I/O sequence scheduler assigns the /O sequence (A) to the T×TL0. The T×TL0 then fetches the task context corresponding to the I/O sequence (A). During the time period 912, the T×TL0 processes the I/O sequence (A) based on the task context. Suppose the processing is a DMA. The T×TL0 then programs its DMA engine to fetch the host data from the host memory to the transmit data buffer. During the time period 913, the data associated with the I/O sequence (A) are fetched from the host memory.

During the time period 915, the T×TL1 generates an I/O request to the I/O sequence scheduler. The I/O sequence scheduler assigns the /O sequence (B) to the T×TL. The T×TL1 then fetches the task context corresponding to the I/O sequence (B). During the time period 916, the T×TL1 processes the I/O sequence (B) based on the task context. Suppose the processing is a DMA. The T×TL1 then programs its DMA engine to fetch the host data from the host memory to the transmit data buffer. During the time period 917, the data associated with the I/O sequence (B) are fetched from the host memory.

During the time period 920, the Data (A) associated with the I/O sequence (A) are transmitted to the remote node or the corresponding storage device. During this time period, there may be operations initiated or performed by other T×TLs if they are available and there are I/O sequences waiting in the pool.

Similarly, during the time period 930, the Data (B) associated with the I/O sequence (B) are transmitted to the remote node or the corresponding storage device. This time period includes time periods 931, 932, 933, and 934. During the time period 931, the T×TL0 completes sending the Data (A) and updates the task context (A) to reflect the status of the I/O sequence (A). During the time period 932, the T×TL0 generates a request to the I/O sequence scheduler. It is assigned the I/O sequence (C) and fetches the task context for the I/O sequence (C). During the time period 933, the T×TL0 processes the I/O sequence (C) based on the task context. Suppose again it is a DMA transfer. During the time period 934, the data from the host memory are DMA fetched to the transmit data buffer.

During the time period 940, the Data (C) associated with the I/O sequence (C) are transmitted to the destination remote node or storage device. This time period has a time period 942 during which the T×TL1 completes sending the Data (B) and updates the task context (B) to reflect the status of the I/O sequence (B). During the time period 952, the T×TL0 completes sending the Data (C) and updates the task context (C) to reflect the status of the I/O sequence (C).

As shown in the timing diagram, except for the initial period (e.g., the time period 910), the T×TLs may be kept busy continuously to avoid wasteful idle time periods. The actual number of T×TLs that are scheduled to process the I/O sequences depends on the availability of T×TLs, the buffer size, and the processing speed of the DMA engine. Since multiple T×TLs are committed to process the I/O sequences simultaneously, the I/O throughput becomes very high, resulting in efficient I/O processing.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
a task context pre-fetch engine to pre-fetch a first and a second task context from a task context memory based on a first and a second pre-fetch request, respectively, wherein the first and second task contexts each include context information for accessing one of a plurality of storage devices remotely coupled via a network external to the apparatus;
a multi-threaded transmit transport layer (T×TL) coupled to the task context pre-fetch engine, including a first transport layer to process a first input/output (I/O) sequence from a pool of I/O sequences based on the first task context to generate a first transmit data sequence, and a second transport layer to process a second I/O sequence based on the second task context from the pool of I/O sequences to generate a second transmit data sequence, wherein processing the second I/O sequence is associated with a latency period and each I/O sequence of the pool of I/O sequences includes I/O operations for reading and writing data to a different storage device of the plurality of storage devices; and a switch fabric/controller coupled to the multi-threaded TxTL to route the first transmit data sequence to a single link layer interface during the latency period and the second transmit data sequence to the single link layer interface using the switch fabric/controller.

2. The apparatus of claim 1 wherein the multi-threaded TxTL comprises:

a transmit transport protocol engine (PE) to perform I/O operations for reading and writing data;

a frame queue coupled to the transmit transport PE to store frame information;

a direct memory access (DMA) engine coupled to the transmit transport PE to transfer data from a memory to a transmit data buffer based on a DMA descriptor; and a framer coupled to the frame queue and the transmit data buffer to create the frame based on the frame information and to generate a frame transmit request to the switch fabric and controller.

3. The apparatus of claim 2 wherein the transmit transport PE comprises:

an I/O requester to request for an I/O sequence from an I/O sequence scheduler;

a pre-fetch requester to generate the pre-fetch request to the task context pre-fetch engine;

an I/O decision generator to generate an I/O handling decision based on the first and second task context;

a DMA descriptor generator to create the DMA descriptor; and a task context updater to update the first and second task context.

4. The apparatus of claim 3 wherein the I/O decision generator generates a decision to transmit a data frame and a decision to transmit a command frame.

5. The apparatus of claim 2 wherein the frame queue comprises:

a frame header queue to store a frame header for the respective transmit data; and a frame data queue to store the respective transmit data.

6. The apparatus of claim 2 wherein the switch fabric/controller comprises:

a switch to connect the single link layer interface and the multi-threaded TxTL;

a link layer monitor to check link layer status to a remote node having a remote node address; and a controller to control the switch using the flame transmit request and to transmit the flame to the remote node via the switch according to the link layer status and the remote node address.

7. A method comprising:

pre-fetching a first and a second task context from a task context memory based on a first and a second pre-fetch request, respectively, using a task context pre-fetch engine, wherein the first and second task contexts each include context information for accessing one of a plurality of storage devices remotely coupled via a network;

processing a first input/output (I/O) sequence from a pool of I/O sequences using a first transport layer of a multi-threaded transmit transport layer (TxTL) based on the first task context to generate a first transmit data sequence, wherein each I/O sequence of the pool of I/O sequences includes I/O operations for reading and writing data to a different remote storage device of the plurality of storage devices;

processing a second I/O sequence from the pool of I/O sequences via a second transport layer thread of the multi-threaded TxTL based on the second task context to generate a second transmit data sequence, wherein processing the second I/O sequence is associated with a latency period;

routing the first transmit data sequence to a single link layer interface using a switch fabric/controller during the latency period; and routing the second transmit data sequence to the single link layer interface using the switch fabric/controller.

8. The method of claim 7 wherein processing the first and second of I/O sequences comprises:

storing frame information;

transferring data from a memory to a transmit data buffer based on a DMA descriptor;

creating one or more frames based on the frame information; and generating a frame transmit request to the switch fabric/controller.

9. The method of claim 8 wherein the I/O operations for reading and writing data to different remote storage devices of the plurality of storage devices comprises:

requesting for an I/O sequence from an I/O sequence scheduler;

generating the pre-fetch request to the task context pre-fetch engine;

generating an I/O handling decision based on the first and second task context;

creating the DMA descriptor; and updating the first and second task context.

10. The method of claim 9 wherein generating the I/O handling decision comprises generating a decision to transmit a data frame and a decision to transmit a command frame.

11. The method of claim 8 wherein storing the frame information comprises:

storing a frame header for the respective transmit data sequence; and storing the respective transmit data sequence.

12. The method of claim 8 wherein routing the frame comprises:

connecting the single link layer interface to the multi-threaded TxTLs using a switch;

checking link layer status to a remote node having a remote node address;

controlling the switch using the frame transmit request; and transmitting the frame to the remote node via the switch according to the connection status and the remote node address.

13. A system comprising:

a plurality of storage device interfaces to interface to a plurality of storage devices remotely coupled via a network;

an input/output sequence scheduler coupled to the storage device interfaces to schedule processing first input/output (I/O) sequence from a pool of I/O sequences associated with the storage devices and based on a first task context to generate a first transmit data sequence, and a second transport layer to process a second I/O sequence from the pool of I/O sequences based on the second context, wherein each I/O sequence of the I/O pool includes I/O operations for reading and writing data to a different storage device of the plurality of storage devices; and a multi-threaded transmit transport engine (TTE) coupled to the storage device interfaces and the I/O sequence scheduler, the multi-threaded TTE comprising:

a task context pre-fetch engine to pre-fetch a first and the second task context from a task context memory based on a first and a second pre-fetch request, respectively, wherein the first and second task contexts each include context information for accessing one of a plurality of storage devices remotely coupled via the network;

a multi-threaded transmit transport layer (TxTL) coupled to the task context pre-fetch engine, including a first transport layer to process the first I/O sequence to generate a first transmit data sequence, and the second transport layer to process the second I/O sequence to generate a second transmit data sequence, wherein processing the second I/O sequence is associated with a latency period; and a switch fabric/controller coupled to the multi-threaded TxTLs to route the first transmit data sequence during the latency period and the second transmit data sequence to a single link layer interface.

14. The system of claim 13 wherein each of the multi-threaded TxTLs comprises:

a transmit transport protocol engine (PE) to perform I/O operations for reading and writing data;

a frame queue coupled to the transmit transport PE to store frame information;

a direct memory access (DMA) engine coupled to the transmit transport PE to transfer data from a memory to a transmit data buffer based on a DMA descriptor; and a framer coupled to the frame queue and the transmit data buffer to create the frame based on the frame information and to generate a frame transmit request to the switch fabric and controller.

15. The system of claim 14 wherein the transmit transport PE comprises:

an I/O requester to request for an I/O sequence from the I/O sequence scheduler;

a pre-fetch requester to generate at least one of the pre-fetch requests to the task context pre-fetch engine;

an I/O decision generator to generate an I/O handling decision based on the first and second task context;

a DMA descriptor generator to create the DMA descriptor; and a task context updater to update the first and second task context.

16. The system of claim 15 wherein the I/O decision generator generates a decision to transmit a data frame and a decision to transmit a command frame.

17. The system of claim 14 wherein the frame queue comprises:

a frame header queue to store a frame header for the transmit data; and a frame data queue to store the respective transmit data.

18. The system of claim 14 wherein the switch fabric controller comprises:

a switch to connect the single link layer interface and the multi-threaded TxTL;

a link layer monitor to check link layer statuses to remote nodes having remote node addresses; and a controller to control the switch using the frame transmit requests and to transmit the frames to the remote nodes via the switch according to the link layer status and the remote node address.

19. The system of claim 13 wherein the I/O sequence scheduler comprises:

an assigner to assign one of the I/O sequences to the multi-threaded TxTL based on a link layer status; and a counter to keep track of number of threads executing for a remote node.

20. The system of claim 13 wherein the storage devices include at least one of a Serial Attached Small Computer System Interface (SAS) device, a Fiber Channel (FC) device, a Serial Advanced Technology Attachment (SATA) device, an Internet Small Computer System Interface (ISCSI) device, and a Host Bus Adapter (HBA) device.

* * * * *

UNITED STATES PATENT AND TRADEMARK OFFICE
CERTIFICATE OF CORRECTION

PATENT NO.       : 8,149,854 B2
APPLICATION NO.  : 11/174197
DATED            : April 3, 2012
INVENTOR(S)      : Lau et al.

Page 1 of 1

It is certified that error appears in the above-identified patent and that said Letters Patent is hereby corrected as shown below:

In the Claims

In column 9, at line 46 delete -- "flame" -- and insert --frame--.

In column 9, at line 47 delete -- "flame" -- and insert --frame--.

Signed and Sealed this
Eighteenth Day of November, 2014

Michelle K. Lee
*Deputy Director of the United States Patent and Trademark Office*